(12) United States Patent
Yamaguchi et al.

(10) Patent No.: US 12,498,366 B2
(45) Date of Patent: Dec. 16, 2025

(54) MEASUREMENT METHOD FOR FIBROBLAST GROWTH FACTOR-23 BY FORMING IMMUNOCOMPLEXES

(71) Applicant: Canon Medical Diagnostics Corporation, Tokyo (JP)

(72) Inventors: Yuhei Yamaguchi, Shizuoka (JP); Hiromi Miyazaki, Shizuoka (JP); Hitoshi Ono, Shizuoka (JP)

(73) Assignee: Canon Medical Diagnostics Corporation, Tokyo (JP)

( * ) Notice: Subject to any disclaimer, the term of this patent is extended or adjusted under 35 U.S.C. 154(b) by 446 days.

(21) Appl. No.: 16/616,778

(22) PCT Filed: May 30, 2018

(86) PCT No.: PCT/JP2018/020635
§ 371 (c)(1),
(2) Date: Nov. 25, 2019

(87) PCT Pub. No.: WO2018/221544
PCT Pub. Date: Dec. 6, 2018

(65) Prior Publication Data
US 2020/0080995 A1 Mar. 12, 2020

(30) Foreign Application Priority Data
May 31, 2017 (JP) ................ 2017-107509

(51) Int. Cl.
*G01N 33/53* (2006.01)
*G01N 33/536* (2006.01)
*G01N 33/74* (2006.01)

(52) U.S. Cl.
CPC ......... *G01N 33/536* (2013.01); *G01N 33/74* (2013.01); *G01N 2333/50* (2013.01)

(58) Field of Classification Search
None
See application file for complete search history.

(56) References Cited

U.S. PATENT DOCUMENTS

| | | | |
|---|---|---|---|
| 5,710,006 A * | 1/1998 | Kiaei | G01N 33/54393 435/7.1 |
| 2005/0048058 A1 | 3/2005 | Yamazaki et al. | |
| 2012/0219966 A1* | 8/2012 | Kawamura | G01N 33/6866 435/7.1 |
| 2013/0273575 A1* | 10/2013 | Uzawa | G01N 33/538 435/7.92 |

FOREIGN PATENT DOCUMENTS

| | | |
|---|---|---|
| EP | 0345660 A1 | 12/1989 |
| EP | 1466925 A1 | 10/2004 |
| EP | 2495565 A1 | 9/2012 |
| JP | H02-138223 A | 5/1990 |
| JP | H05-34353 A | 2/1993 |
| JP | H07-082171 A | 3/1995 |
| JP | 2004-504063 A | 2/2004 |
| JP | 2004-144728 A | 5/2004 |
| JP | 2005-516180 A | 6/2005 |
| JP | 2007-127423 A | 5/2007 |
| JP | 2009-244146 A | 10/2009 |
| JP | 2013-246080 A | 12/2013 |
| JP | 2016-75645 A | 5/2016 |
| WO | 02/08271 A1 | 1/2002 |
| WO | 03/057733 A1 | 7/2003 |
| WO | 2007/010995 A1 | 1/2007 |
| WO | 2012/029837 A1 | 3/2012 |
| WO | 2012/147670 A1 | 11/2012 |
| WO | 2015/064594 A1 | 5/2015 |
| WO | 2017/104567 A1 | 6/2017 |

OTHER PUBLICATIONS

Translation of discription from JP2016075645A. Patent Translate, machine translation, Jun. 7, 2022.*
Rubingh (Curr. Opin. Colloid & Interface Sci. 1: 598-603, 1996).*
Tiwari et al., Int. J. Eng. Res. App. 8(9): 61-66, (Part-I) 2018.*
Jones (Chem. Soc. Rev., 1992, pp. 127-136).*
Nippon Nyukazai Co., Ltd, Safety Data Sheet for NEWCOL 740, 2018, [retrieved on Feb. 21, 2025]. Retrieved from the Internet: <URL:www.nipponnyukazai.co.jp/media/file/products/products_sds_en_0163.pdf.html>, 7 pages.*
Newman et al. Advanced Drug Delivery Reviews. 32: 199-223, 1998.*
Oleo & Speciality Chemicals Catalogue Functional Materials Division, 2024, [retrieved on Feb. 21, 2025]. Retrieved from the Internet: URL:www.nof.co.jp/files/business/oleo/english/comprehensive.pdf.html, 70 pages.*
Pharmacompass website for Pronon 208, 2005, [retrieved on Feb. 21, 2025]. Retrieved from the Internet: <URL: www.pharmacompass.com/chemistry-chemical-name/pronon-208.html>, 1 page.*

(Continued)

*Primary Examiner* — Christine J Saoud
(74) *Attorney, Agent, or Firm* — Morgan, Lewis & Bockius LLP

(57) ABSTRACT

A method for measuring fibroblast growth factor-23 (hereinafter, indicated as FGF-23) in a sample, which comprises the steps of:

(1) reacting in an aqueous medium, a sample and a first antibody or an antibody fragment thereof which binds to FGF-23;

(2) reacting in an aqueous medium, a second antibody or an antibody fragment thereof which binds to FGF-23 with Immunocomplex 1 produced in the aforementioned step (1) to produce Immunocomplex 2 consisting of the first antibody or the antibody fragment thereof which binds to FGF-23, FGF-23, and the second antibody or the antibody fragment thereof which binds to FGF-23; and (3) measuring Immunocomplex 2 produced in the aforementioned step (2); wherein the reaction of step (1) and/or step (2) is carried out in an aqueous medium comprising a surfactant such as a polyoxyethylene alkyl ether.

13 Claims, No Drawings

(56) References Cited

OTHER PUBLICATIONS

Yamazaki et al., "Increased circulatory level of biologically active full-length FGF-23 in patients with hypophosphatemic rickets/osteomalacia," The Journal of Clinical Endocrinology & Metabolism, 87 (11): 4957-4960 (2002).
Jonsson et al., "Fibroblast Growth Factor 23 in Oncogenic Osteomalacia and X-Linked Hypophosphatemia," New England Journal of Medicine, 348 (17): 1656-1663 (2003).
Yamashita, "Discovery of a novel hormone controlling renal phosphorus transport," Kidney and Metabolic Bone Diseases, 15 (4): 351-356 (2002).
International Search Report issued in corresponding International Patent Application No. PCT/JP2018/020635 dated Sep. 4, 2018.
International Preliminary Report on Patentability and Written Opinion issued in International Patent Application No. PCT/JP2018/020635 by Authorized officer, Yukari Nakamura, dated Dec. 12, 2019.
Extended European Search Report issued in corresponding European Patent Application No. 18810088.7, dated Feb. 22, 2021.

\* cited by examiner

MEASUREMENT METHOD FOR FIBROBLAST GROWTH FACTOR-23 BY FORMING IMMUNOCOMPLEXES

TECHNICAL FIELD

The present invention relates to a method, a reagent, and a kit for measuring fibroblast growth factor-23 (hereinafter, indicated as FGF-23) in a sample.

BACKGROUND ART

FGF-23, a member of the fibroblast growth factor (FGF) family, is a polypeptide consisting of 251 amino acids produced mainly in bone tissues, which acts on the kidney to inhibit reabsorption of phosphorus in the renal tubules. In recent years, FGF-23 has been suggested to be involved in diseases such as hypophosphatemic rickets, tumor-induced osteomalacia, and renal failure (see Non-Patent Document 1).

FGF-23 is released to the outside of cells as a mature protein of approximately 32.5-kDa, which has a structure where sugar chains are added through modification to a polypeptide consisting of 227 amino acids resulting from the dissociation of the N-terminal 24 amino acids. The bond between position 197 and position 198 from the N-terminus of FGF-23 is cleaved by thrombin, and the fragment of position 198 to position 251 exists in blood as a C-terminal fragment.

To date, antibodies against FGF-23 have been obtained (see Patent Documents 1 and 2; and Non-Patent Document 2), immunoassays for FGF-23 in the serum or plasma which use these antibodies have been reported (see Patent Document 1 and Non-Patent Document 2), and measurement kits based on these measurement methods are also commercially available [Human Intact FGF-23 ELISA Kit (Immutopics), Human FGF-23 (C-Term) ELISA Kit (Immutopics), and FGF-23 measurement reagent (Kainos)]. Furthermore, immunoassays for FGF-23 which use magnetic particles have been also reported (see Patent Document 3).

CITATION LIST

Patent Documents

[Patent Document 1] WO 2003/057733 pamphlet
[Patent Document 2] Japanese Patent Kohyo Publication No. (JP-A) 2004-504063 (unexamined Japanese national phase publication corresponding to a non-Japanese international publication)
[Patent Document 3] WO 2012/029837 pamphlet

Non-Patent Documents

[Non-Patent Document 1] Jin to Kotsu Taisha (Kidney and Metabolic Bone Diseases), vol. 15, No. 4, p. 351-356 (2002).
[Non-Patent Document 2] N ENGL J MED, vol. 348, No. 17, p. 1656-1663 (2003).

SUMMARY OF THE INVENTION

Problems to be Solved by the Invention

An objective of the present invention is to provide an accurate and highly sensitive method, reagent, and kit for measuring FGF-23 in a sample.

Means for Solving the Problems

The present inventors carried out dedicated research to solve the above-mentioned problems, and as a result, found that carrying out the reaction between a sample and an antibody or an antibody fragment thereof which binds to FGF-23 in an aqueous medium comprising at least one type of surfactant selected from the group consisting of polyoxyethylene alkyl ethers (hereinafter, referred to as POE alkyl ethers), polyoxyethylene-polyoxypropylene copolymers (hereinafter, POE-POP copolymers), and polyoxyethylene polycyclic phenyl ethers (hereinafter, referred to as POE polycyclic phenyl ethers), allows accurate and highly sensitive measurement of FGF-23 in the sample, and completed the present invention.

More specifically, the present invention relates to [1] to below:

[1] A method for measuring FGF-23 in a sample, which comprises the steps of:
  (1) reacting in an aqueous medium, a sample and a first antibody or an antibody fragment thereof which binds to FGF-23 to produce Immunocomplex 1 consisting of FGF-23 and the first antibody or the antibody fragment thereof which binds to FGF-23;
  (2) reacting in an aqueous medium, a second antibody or an antibody fragment thereof which binds to FGF-23 with Immunocomplex 1 produced in the aforementioned step (1) to produce Immunocomplex 2 consisting of the first antibody or the antibody fragment thereof which binds to FGF-23, FGF-23, and the second antibody or the antibody fragment thereof which binds to FGF-23; and
  (3) measuring Immunocomplex 2 produced in the aforementioned step (2);
  wherein the reaction of step (1) and/or step (2) is carried out in an aqueous medium comprising at least one type of surfactant selected from the group consisting of POE alkyl ethers, POE-POP copolymers, and POE polycyclic phenyl ethers.

[2] The method of [1], wherein the surfactant is a POE alkyl ether.

[3] The method of [2], wherein the POE alkyl ether is a POE alkyl ether having an alkyl comprising 8 to 24 carbon atoms.

[4] The method of [3], wherein the POE alkyl ether is a POE alkyl ether having an alkyl comprising 12 to 20 carbon atoms.

[5] A reagent for measuring FGF-23 in a sample, which comprises a first antibody or an antibody fragment thereof which binds to FGF-23, a second antibody or an antibody fragment thereof which binds to FGF-23, and at least one type of surfactant selected from the group consisting of POE alkyl ethers, POE-POP copolymers, and POE polycyclic phenyl ethers.

[6] The reagent of [5], wherein the surfactant is a POE alkyl ether.

[7] The reagent of [6], wherein the POE alkyl ether is a POE alkyl ether having an alkyl comprising 8 to 24 carbon atoms.

[8] The reagent of [7], wherein the POE alkyl ether is a POE alkyl ether having an alkyl comprising 12 to 20 carbon atoms.

[9] A kit for measuring FGF-23, which comprises a first reagent comprising a first antibody or an antibody fragment thereof which binds to FGF-23, and a second reagent comprising a second antibody or an antibody fragment thereof which binds to FGF-23; wherein at least one type of surfactant selected from the group consisting of POE alkyl ethers, POE-POP copolymers, and POE polycyclic phenyl ethers, is included in at least one of the first reagent and the second reagent.

[10] A kit for measuring FGF-23, which comprises a first reagent comprising a first antibody or an antibody fragment thereof which binds to FGF-23, a second reagent comprising a second antibody or an antibody fragment thereof which binds to FGF-23, and a third reagent comprising at least one type of surfactant selected from the group consisting of POE alkyl ethers, POE-POP copolymers, and POE polycyclic phenyl ethers.

[11] The kit of [9] or [10], wherein the surfactant is a POE alkyl ether.

[12] The kit of [11], wherein the POE alkyl ether is a POE alkyl ether having an alkyl comprising 8 to 24 carbon atoms.

[13] The kit of [12], wherein the POE alkyl ether is a POE alkyl ether having an alkyl comprising 12 to 20 carbon atoms.

Effects of the Invention

The present invention provides an accurate and highly sensitive method, reagent, and kit for measuring FGF-23 in a sample.

MODE FOR CARRYING OUT THE INVENTION

1. Measurement Methods

The method for measuring FGF-23 in a sample according to the present invention is a method, which comprises the steps of:
(1) reacting in an aqueous medium, a sample and a first antibody or an antibody fragment thereof which binds to FGF-23 to produce Immunocomplex 1 consisting of FGF-23 and the first antibody or the antibody fragment thereof which binds to FGF-23;
(2) reacting in an aqueous medium, a second antibody or an antibody fragment thereof which binds to FGF-23 with Immunocomplex 1 produced in the aforementioned step (1) to produce Immunocomplex 2 consisting of the first antibody or the antibody fragment thereof which binds to FGF-23, FGF-23, and the second antibody or the antibody fragment thereof which binds to FGF-23; and
(3) measuring Immunocomplex 2 produced in the aforementioned step (2);
wherein the reaction of step (1) and/or step (2) is carried out in an aqueous medium comprising at least one type of surfactant selected from the group consisting of POE alkyl ethers, POE-POP copolymers, and POE polycyclic phenyl ethers.

Furthermore, the concentration of FGF-23 in the sample can be determined by performing the following steps (4) and (5) after step (3):
(4) carrying out the aforementioned steps (1) to (3) using known concentrations of FGF-23 as the sample to produce a calibration curve showing the relationship between the FGF-23 concentrations and the measured values; and
(5) determining the concentration of FGF-23 in the sample by using the measured values obtained from the measurements in step (3) and the calibration curve prepared in step (4).

<<Step (1)>>

In Step (1), the method for reacting in an aqueous medium a sample and a first antibody or an antibody fragment thereof which binds to FGF-23 is not particularly limited as long as it is a method that produces Immunocomplex 1 consisting of FGF-23 and the first antibody or the antibody fragment thereof that binds to FGF-23.

The first antibody or the antibody fragment thereof which binds to FGF-23 may or may not be fixed to an insoluble carrier, and it is preferably fixed.

When the first antibody or the antibody fragment thereof which binds to FGF-23 is fixed to an insoluble carrier, the insoluble carrier to which the first antibody or the antibody fragment thereof which binds to FGF-23 is fixed may be produced in an antigen-antibody reaction solution. In this case, the insoluble carrier to which the first antibody or the antibody fragment thereof which binds to FGF-23 has been fixed can be produced in an antigen-antibody reaction solution by reacting, in an antigen-antibody reaction solution, a first antibody or an antibody fragment thereof which binds to FGF-23 to which one of the units forming a pair of affinitive substances (A) is bound with an insoluble carrier to which the other unit forming the pair of affinitive substances (a) is bound.

Examples of methods for producing Immunocomplex 1 in Step (1) using the first antibody or the antibody fragment thereof which binds to FGF-23 to which one of the units forming a pair of affinitive substances (A) is bound and the insoluble carrier to which the other unit forming the pair of affinitive substances (a) is bound include the following:
the method of simultaneously reacting in an aqueous medium a sample, the first antibody or the antibody fragment thereof which binds to FGF-23 to which one of the units forming a pair of affinitive substances (A) is bound, and the insoluble carrier to which the other unit forming the pair of affinitive substances (a) is bound to produce Immunocomplex 1;
the method of reacting in an aqueous medium a sample and the first antibody or the antibody fragment thereof which binds to FGF-23 to which one of the units forming a pair of affinitive substances (A) is bound, and then adding to this reaction solution, the insoluble carrier to which the other unit forming the pair of affinitive substances (a) is bound to produce Immunocomplex 1; and
the method of reacting in an aqueous medium the first antibody or the antibody fragment thereof which binds to FGF-23 to which one of the units forming a pair of affinitive substances (A) is bound and the insoluble carrier to which the other unit forming the pair of affinitive substances (a) is bound, and then adding a sample to this reaction solution to produce Immunocomplex 1.

Examples of the combination for A-a include the following:
combination of biotin and avidins (avidin, NeutrAvidin, streptavidin, or such);
combination of avidins (avidin, NeutrAvidin, streptavidin, or such) and biotin; and
combination of the Fc region of a first antibody or an antibody fragment thereof which binds to FGF-23, and an antibody that binds to the Fc region.

The insoluble carrier is not particularly limited as long as it is an insoluble carrier that fixes the first antibody or the antibody fragment thereof which binds to FGF-23 and enables the method for measuring FGF-23 of the present invention, and examples include plates made of synthetic resin such microtiter plates, beads made of glass or synthetic resin, balls made of glass or synthetic resin, latex, magnetic particles, various membranes such as a nitrocellulose membrane, and test tubes made of synthetic resin. Examples of plates made of synthetic resin include polyethylene plates, polypropylene plates, and polystyrene plates.

The means for fixing a first antibody or an antibody fragment thereof which binds to FGF-23 to an insoluble carrier is not particularly limited as long as it is a fixing means that enables the method for measuring FGF-23 of the present invention, and examples include fixing by chemical bonding and physical adsorption. Examples of physical adsorption include electrostatic bonding, hydrogen bonding, and hydrophobic bonding. Examples of chemical bonding include covalent bonding and coordinate bonding.

A first antibody or an antibody fragment thereof which binds to FGF-23 can be fixed to an insoluble carrier directly or indirectly using the aforementioned physical bonding and/or chemical bonding. Examples of the indirect fixing method include the method of fixing a first antibody or an antibody fragment thereof which binds to FGF-23 to an insoluble carrier through specific bonding between biotin and avidins (avidin, streptavidin, NeutrAvidin, or such). Furthermore, the first antibody or the antibody fragment thereof which binds to FGF-23 may be fixed to the insoluble carrier by covalent bonds via a linker.

The linker is, for example, a molecule that can covalently bind with both a functional group of the first antibody or the antibody fragment thereof which binds to FGF-23 and a functional group on the surface of the insoluble carrier. Examples of such a molecule include molecules bearing, within the same molecule, a first reactive group that can react with a functional group of the first antibody or the antibody fragment thereof which binds to FGF-23 and a second reactive group that can react with a functional group on the surface of the insoluble carrier, and molecules in which the first reactive group and the second reactive group are different groups are preferably used. Examples of the functional group of the first antibody or the antibody fragment thereof which binds to FGF-23 and the functional group retained on the surface of the insoluble carrier include a carboxyl group, an amino group, a glycidyl group, a sulfhydryl group, a hydroxy group, an amido group, an imino group, an N-hydroxysuccinyl group, and a maleimide group. Examples of the reactive group on the linker include groups such as arylazide, carbodiimide, hydrazide, aldehyde, hydroxymethyl phosphine, imide ester, isocyanate, maleimide, N-hydroxy succinimide ester, pentafluorophenyl (PFP) ester, psoralen, pyridyl disulfide, and vinyl sulfone.

The reaction temperature in the reaction between the sample and the first antibody or the antibody fragment thereof which binds to FGF-23 of Step (1) is not particularly limited as long as it is a temperature that enables the method for measuring FGF-23 of the present invention, and is ordinarily 0° C. to 50° C., preferably 4° C. to 45° C., and particularly preferably 20° C. to 40° C. The reaction time of the above reaction is not particularly limited as long as it is a reaction time that enables the method for measuring FGF-23 of the present invention, and is ordinarily one minute to four hours, preferably five minutes to three hours, and particularly preferably ten minutes to two hours. The concentration of the first antibody or the antibody fragment thereof which binds to FGF-23 in the reaction solution is not particularly limited as long as it is a concentration that enables the method for measuring FGF-23 of the present invention, and is ordinarily 0.01 µg/mL to 100 µg/mL, and is preferably 0.1 µg/mL to 20 µg/mL.

<<Step 2>>

In Step (2), the second antibody or the antibody fragment thereof which binds to FGF-23 may be added to and made to react with Immunocomplex 1 produced in Step (1), or Immunocomplex 1 produced in Step (1) may be added to and made to react with the second antibody or the antibody fragment thereof which binds to FGF-23.

The reaction temperature in the reaction of Step (2) which produces Immunocomplex 2 consisting of the first antibody or the antibody fragment thereof which binds to FGF-23, FGF-23, and the second antibody or the antibody fragment thereof which binds to FGF-23 is not particularly limited as long as it is a temperature that enables the method for measuring FGF-23 of the present invention, and is ordinarily 0° C. to 50° C., preferably 4° C. to 45° C., and particularly preferably 20° C. to 40° C. The reaction time of the above reaction is not particularly limited as long as it is a reaction time that enables the method for measuring FGF-23 of the present invention, and is ordinarily one minute to four hours, preferably five minutes to three hours, and particularly preferably ten minutes to two hours. The concentration of the second antibody or the antibody fragment thereof which binds to FGF-23 in the reaction solution is not particularly limited as long as it is a concentration that enables the method for measuring FGF-23 of the present invention, and is ordinarily 0.01 µg/mL to 100 µg/mL, and is preferably 0.1 µg/mL to 20 µg/mL.

Step (1) or Step (2), or both steps are carried out in an aqueous medium containing at least one type of surfactant selected from the group consisting of POE alkyl ethers, POE-POP copolymers, and POE polycyclic phenyl ethers.

The POE alkyl ether in the present invention is not particularly limited as long as it is a POE alkyl ether that enables the method for measuring FGF-23 of the present invention, and includes, for example, a POE alkyl ether having an alkyl comprising 8 to 24 carbon atoms, and is preferably a POE alkyl ether having an alkyl comprising 12 to 20 carbon atoms. Examples of the alkyl comprising 8 to 24 carbon atoms include octyl, isooctyl, nonyl, decyl, isodecyl, undecyl, dodecyl (lauryl), tridecyl, tetradecyl (myristyl), pentadecyl, hexadecyl (cetyl), heptadecyl, octadecyl (stearyl), oleyl, nonadecyl, icosyl, heneicosyl, docosyl (behenyl), tricosyl, and tetracosyl. Examples of the alkyl comprising 12 to 20 carbon atoms include dodecyl (lauryl), tridecyl, tetradecyl (myristyl), pentadecyl, hexadecyl (cetyl), heptadecyl, octadecyl (stearyl), oleyl, nonadecyl, and icosyl. Examples of commercially available POE alkyl ether include NONION K-204 and NONION K-220 (these are polyoxyethylene lauryl ethers; manufactured by NOF Corporation); NONION E-205 and NONION E-230 (these are polyoxyethylene oleyl ethers; manufactured by NOF Corporation); NONION S-215 and NONION S-225 (these are polyoxyethylene stearyl ethers; manufactured by NOF Corporation); EMULGEN 108 and EMULGEN 120 (these are polyoxyethylene lauryl ethers; manufactured by Kao Corporation); EMULGEN 220 (polyoxyethylene cetyl ether; manufactured by Kao Corporation); EMULGEN 320P (polyoxyethylene stearyl ether; manufactured by Kao Corporation); EMULGEN 420 (polyoxyethylene oleyl ether; manufactured by Kao Corporation); ADEKA TOL LA-875 and ADEKA TOL LA-975 (these are polyoxyethylene lauryl ethers; manufactured by ADEKA Corporation); ADEKA TOL OA-7 (polyoxyethylene oleyl ether; manufactured by ADEKA Corporation); EMULMIN NL-70, EMULMIN NL-90, EMULMIN NL-100, EMULMIN NL-110, EMULMIN LS-80, and EMULMIN LS-90 (these are polyoxyethylene lauryl ethers; manufactured by Sanyo Chemical Industries, Ltd.); BLAUNON EL-1507, BLAUNON EL-1509, BLAUNON EL-1512P, BLAUNON EL-1515, and BLAUNON EL-1521 (these are polyoxyethylene lauryl ethers; manufactured by Aoki Oil Industrial Co., Ltd.); BLAUNON CH-310, BLAUNON CH-310L, and BLAUNON CH-313 (these are polyoxyethylene cetyl ethers; manufactured by Aoki Oil Industrial Co., Ltd.); BLAUNON SR-711 (polyoxyethylene stearyl ether; manufactured by Aoki Oil Industrial Co., Ltd.); BLAUNON EN-1511 (polyoxyethylene oleyl ether; manufactured by Aoki Oil Industrial Co., Ltd.); NOIGEN SD-60, NOIGEN SD-70, NOIGEN SD-80, NOIGEN SD-110, and NOIGEN SD-150 (these are polyoxyethylene isodecyl ethers; manufactured by DKS Co., Ltd.); and NOIGEN TDS-80, NOIGEN TDS-100, and NOIGEN TDS-200D (these are polyoxyethylene tridecyl ethers; manufactured by DKS Co., Ltd.).

The POE-POP copolymer in the present invention is not particularly limited as long as it is a POE-POP copolymer that enables the method for measuring FGF-23 of the present invention. The number of moles added in the polyoxyethylene of POE-POP copolymer of the present invention is not particularly limited, and is preferably five to 300 moles, and more preferably 17 to 200 moles. Furthermore, the number of moles added in the polyoxypropylene is also not particularly limited, and is preferably 17 to 70 moles and more preferably 20 to 40 moles. Examples of commercially available POE-POP copolymer include Adeka Pluronic L-61 (polyoxyethylene (5) polyoxypropylene glycol (30); manufactured by ADEKA Corporation), Adeka Pluronic L-71 (polyoxyethylene (5) polyoxypropylene glycol (35); manufactured by ADEKA Corporation), PLONON 201 (polyoxyethylene (5) polyoxypropylene glycol (35); manufactured by NOF Corporation), Adeka Pluronic L-34 (polyoxyethylene (16) polyoxypropylene glycol (17); manufactured by ADEKA Corporation), NEWPOL PE-78 (polyoxyethylene (150) polyoxypropylene glycol (35); manufactured by Sanyo Chemical Industries, Ltd.), PLONON 208 (polyoxyethylene (150) polyoxypropylene glycol (35); manufactured by NOF Corporation), Adeka Pluronic F-68 (polyoxyethylene (160) polyoxypropylene glycol (30); manufactured by ADEKA Corporation), EMULGEN PP-290 (polyoxyethylene (160) polyoxypropylene glycol (30); manufactured by Kao Corporation), and Adeka Pluronic F-88 (polyoxyethylene (200) polyoxypropylene glycol (40); manufactured by ADEKA Corporation).

The POE polycyclic phenyl ether of the present invention is not particularly limited as long as it is a POE polycyclic phenyl ether that enables the method for measuring FGF-23 of the present invention. Examples of the polycyclic phenyl in the POE polycyclic phenyl ether of the present invention include phenyl groups substituted with two or more groups (substituents) each having one aromatic ring therein, and phenyl groups substituted with one or multiple groups (substituents) each having two or more aromatic rings therein. Examples of the groups having one aromatic ring therein include benzyl and 1-(phenyl)ethyl. Examples of the group having two or more aromatic rings therein include naphthyl. Examples of commercially available POE polycyclic phenyl ether include Newcol 704, Newcol 706, Newcol 707, Newcol 708, Newcol 709, Newcol 710, Newcol 711, Newcol 712, Newcol 714, Newcol 740, Newcol 610, Newcol 2607, Newcol 2609, and Newcol 2614 (the above are manufactured by Nippon Nyukazai Co., Ltd.).

In the method for measuring FGF-23 of the present invention, two or more types of surfactants selected from the group consisting of POE alkyl ethers, POE-POP copolymers, and POE polycyclic phenyl ethers may be used in combination.

The concentration of the surfactant selected from the group consisting of POE alkyl ethers, POE-POP copolymers, and POE polycyclic phenyl ethers of the present invention in the reaction solution is not particularly limited as long as it is a concentration that enables the method for measuring FGF-23 of the present invention, and is ordinarily 0.0001% to 10% (w/v), preferably 0.001% to 5% (w/v), and particularly preferably 0.01% to 1% (w/v).

Steps (1) and (2) may be carried out sequentially or simultaneously. When carrying out Steps (1) and (2) simultaneously, the sample, the first antibody or the antibody fragment thereof which binds to FGF-23, and the second antibody or the antibody fragment thereof which binds to FGF-23 are reacted simultaneously in an aqueous medium to produce Immunocomplex 2 consisting of the first antibody or the antibody fragment thereof which binds to FGF-23, FGF-23, and the second antibody or the antibody fragment thereof which binds to FGF-23; and FGF-23 in the sample is measured by measuring the produced Immunocomplex 2. When carrying out Steps (1) and (2) simultaneously, Immunocomplex 2 is preferably produced on the aforementioned insoluble carrier. Examples of methods for producing Immunocomplex 2 on the insoluble carrier include the following:

(i) the method of simultaneously reacting in an aqueous medium a sample, a first antibody or an antibody fragment thereof which binds to FGF-23, a second antibody or an antibody fragment thereof which binds to FGF-23, and an insoluble carrier;

(ii) the method of simultaneously reacting in an aqueous medium a sample, an insoluble carrier to which a first antibody or an antibody fragment thereof which binds to FGF-23 has been fixed, and a second antibody or an antibody fragment thereof which binds to FGF-23; and (iii) the method of simultaneously reacting in an aqueous medium a sample, a first antibody or an antibody fragment thereof which binds to FGF-23, and a second antibody or an antibody fragment thereof which binds to FGF-23 to produce Immunocomplex 2, and reacting an insoluble carrier with the produced Immunocomplex 2.

In the above-mentioned methods (i) and (iii), it is preferable to use of a first antibody or an antibody fragment thereof which binds to FGF-23 bound with one of the units forming a pair of affinitive substances (A) and an insoluble carrier bound with the other unit forming the pair of affinitive substances (a). Examples of the combination for (A)-(a) include the combinations described above.

Furthermore, between Step (1) and Step (2), a step of washing the insoluble carrier after the reaction of Step (1) may be added as necessary. The washing solution to be used for washing the insoluble carrier after the reaction of Step (1) is not particularly limited as long as it is a washing solution that enables the method for measuring FGF-23 of the present invention, and examples include phosphate buffered saline (10 mmol/L phosphate buffer containing 0.15 mol/L sodium chloride, pH 7.2, hereinafter indicated as PBS), and PBS containing a surfactant. Examples of the surfactant include nonionic surfactants such as Tween 20.

The washing step may or may not be added after Step (2), and is preferably set up additionally. The washing solution to be used for washing the insoluble carrier after Step (2) is not particularly limited as long as it is a washing solution that enables the method for measuring FGF-23 of the present invention, and examples include the aforementioned washing solutions.

<<Step (3)>>

In Step (3), the concentration of FGF-23 in the sample is determined by measuring Immunocomplex 2 produced in Step (2) using the following methods.

(i) in Case the Second Antibody or the Antibody Fragment Thereof which Binds to FGF-23 is not Labeled The amount of Immunocomplex 2 produced in Step (2) can be measured by reacting a labeled third antibody or an antibody fragment thereof, which is an antibody (hereinafter, referred to as the third antibody) or an antibody fragment thereof that binds to the second antibody or the antibody fragment thereof which binds to FGF-23 and that is bound with a label, with the second antibody or the antibody fragment thereof which binds to FGF-23 in Immunocomplex 2, to form Immunocomplex 3 consisting of the first antibody or the antibody fragment thereof which binds to FGF-23, FGF-23, the second antibody or the antibody fragment thereof which binds to FGF-23, and the labeled third antibody or the antibody fragment thereof, and measuring the label in the immunocomplex by the later-described method. Examples of the third antibody include an antibody or an antibody fragment thereof which binds to the Fc region of the second antibody or the antibody fragment thereof which binds to FGF-23.

The reaction temperature for the reaction between the labeled third antibody or the antibody fragment thereof and the second antibody or the antibody fragment thereof which binds to FGF-23 in Immunocomplex 2 is not particularly limited as long as it is a temperature that enables the method for measuring FGF-23 of the present invention, and is ordinarily 0° C. to 50° C., preferably 4° C. to 45° C., and particularly preferably 20° C. to 40° C. The reaction time for this reaction is not particularly limited as long as it is a reaction time that enables the method for measuring FGF-23 of the present invention, and is ordinarily one minute to four hours, preferably five minutes to three hours, and particularly preferably ten minutes to two hours. The concentration of the labeled third antibody or the antibody fragment thereof in the reaction solution is not particularly limited as long as it is a concentration that enables the method for measuring FGF-23 of the present invention, and is ordinarily 0.01 µg/mL to 100 µg/mL, and is preferably 0.1 µg/mL to 20 µg/mL.

(ii) in Case the Second Antibody or the Antibody Fragment Thereof which Binds to FGF-23 is Labeled The amount of Immunocomplex 2 produced in Step (2) can be measured by measuring the label in Immunocomplex 2. More specifically, Immunocomplex 2 produced in Step (2) can be measured by measuring the label in Immunocomplex 2 which consists of the first antibody or the antibody fragment thereof which binds to FGF-23, FGF-23, and the labeled second antibody or the antibody fragment thereof in which a label is bound to the second antibody or the antibody fragment thereof which binds to FGF-23. The labeled second antibody or the antibody fragment thereof is a substance in which the later-described label is bound to the second antibody or the antibody fragment thereof which binds to FGF-23, and can be prepared by known methods.

Examples of the label include enzymes, fluorescent substances, luminescent substances, radioisotopes, biotin, digoxigenin, polypeptides containing a tag sequence, metallic colloid particles, and colored latex particles.

Examples of enzymes include alkaline phosphatase, peroxidase, galactosidase, glucuronidase, and luciferase.

Examples of fluorescent substances include fluorescein isothiocyanate (FITC) and rhodamine B-isothiocyanate (RITC). Examples of other fluorescent substances include quantum dot (Science, 281, 2016-2018, 1998), phycobiliproteins such as phycoerythrin, and fluorescence-emitting proteins such as green fluorescent protein (GFP), red fluorescent protein (RFP), yellow fluorescent protein (YFP), and blue fluorescent protein (BFP).

Examples of luminescent substances include acridinium ester and derivatives thereof, a ruthenium complex compound, and lophine. Examples of the ruthenium complex compound include ruthenium complex compounds described in Clin. Chem. 37, 9, 1534-1539, 1991.

Examples of radioisotopes include $^{3}H$, $^{14}C$, $^{35}S$, $^{32}P$, $^{125}I$, and $^{131}I$.

Depending on the label used, the means for measuring the label in Immunocomplex 2 consisting of the first antibody or the antibody fragment thereof which binds to FGF-23, FGF-23, and the labeled second antibody or the antibody fragment thereof which binds to FGF-23, or the means for measuring the label in Immunocomplex 3 consisting of the first antibody or the antibody fragment thereof which binds to FGF-23, FGF-23, the second antibody or the antibody fragment thereof which binds to FGF-23, and the labeled third antibody or the antibody fragment thereof, can be suitably selected.

In case the label is a fluorescent substance, a fluorometer, fluorescence multi-well plate reader, or such may be used to measure the fluorescence intensity.

In case the label is a luminescent substance, a luminescence photometer, luminescence multi-well plate reader, or such may be used to measure the luminescence intensity.

In case the label is a radioisotope, a scintillation counter, γ-well counter, or such may be used to measure the radioactivity.

In case the label is an enzyme, the amount of labeling can be quantified by measuring the enzyme activity. For example, the amount of labeling can be measured by reacting a substrate of the enzyme with the enzyme and measuring the formed product.

In case the enzyme is peroxidase, peroxidase activity can be measured, for example, by absorbance methods, fluorescence methods, or such. Examples of a method of measuring peroxidase activity by an absorbance method include a method in which peroxidase is reacted with a combination of hydrogen peroxide and an oxidative coloring chromogen, which are substrates of peroxidase, and the absorbance of the reaction solution is measured using a spectrophotometer, multi-well plate reader, or the like. Examples of the oxidative coloring chromogen include a leuco-type chromogen and an oxidative coupling-coloring chromogen.

The leuco-type chromogen is a substance that is converted into a dye by itself in the presence of hydrogen peroxide and a peroxidative substance such as peroxidase. Specific examples include tetramethylbenzidine, o-phenylenediamine, 10-N-carboxymethylcarbamoyl-3,7-bis(dimethylamino)-10H-phenothiazine (CCAP), 10-N-methylcarbamoyl-3,7-bis(dimethylamino)-10H-phenothiazine (MCDP), N-(carboxymethylaminocarbonyl)-4,4'-bis(dimethylamino) diphenylamine sodium salt (DA-64), 10-N-carboxymethylcarbamoyl-3,7-bis (dimethylamino)-10H-phenothiazine sodium salt (DA-67), 4,4'-bis(dimethylamino)diphenylamine, and bis[3-bis(4-chlorophenyl)methyl-4-dimethylaminophenyl] amine (BCMA).

The oxidative coupling-coloring chromogen is a substance that forms a dye by oxidative coupling of two compounds in the presence of hydrogen peroxide and a peroxidative substance such as peroxidase. Examples of the combination of two compounds include a combination of a coupler and an aniline compound (Trinder reagent), and a combination of a coupler and a phenol compound.

Examples of the coupler include 4-aminoantipyrine (4-AA) and 3-methyl-2-benzothiazolinonehydrazine.

Examples of the anilines include N-(3-sulfopropyl) aniline, N-ethyl-N-(2-hydroxy-3-sulfopropyl)-3-methylaniline (TOOS), N-ethyl-N-(2-hydroxy-3-sulfopropyl)-3,5-dimethylaniline (MAOS), N-ethyl-N-(2-hydroxy-3-sulfopropyl)-3,5-dimethoxyaniline (DAOS), N-ethyl-N-(3-sulfopropyl)-3-methylaniline (TOPS), N-(2-hydroxy-3-sulfopropyl)-3,5-dimethoxyaniline (HDAOS), N,N-dimethyl-3-methylaniline, N,N-bis(3-sulfopropyl)-3,5-dimethoxyaniline, N-ethyl-N-(3-sulfopropyl)-3-methoxyaniline, N-ethyl-N-(3-sulfopropyl) aniline, N-ethyl-N-(3-sulfopropyl)-3,5-dimethoxyaniline, N-(3-sulfopropyl)-3,5-dimethoxyaniline, N-ethyl-N-(3-sulfopropyl)-3,5-dimethylaniline, N-ethyl-N-(2-hydroxy-3-sulfopropyl)-3-methoxyaniline, N-ethyl-N-(2-hydroxy-3-sulfopropyl) aniline, N-ethyl-N-(3-methylphenyl)-N'-succinylethylenediamine (EMSE), N-ethyl-N-(3-methylphenyl)-N'-acetylethylenediamine, and N-ethyl-N-(2-hydroxy-3-sulfopropyl)-4-fluoro-3,5-dimethoxyaniline (F-DAOS).

Examples of the phenols include phenol, 4-chlorophenol, 3-methylphenol, and 3-hydroxy-2,4,6-triiodobenzoic acid (HTIB).

Examples of the method of measuring peroxidase activity by a fluorescence method include a method in which peroxidase is reacted with a combination of hydrogen peroxide and a fluorescent substance, which are substrates of peroxidase, and the intensity of the generated fluorescence is measured using a spectrofluorometer, fluorescence multi-well plate reader, or the like. Examples of the fluorescent substance include 4-hydroxyphenylacetic acid, 3-(4-hydroxyphenyl) propionic acid, and coumarin.

Examples of the method of measuring peroxidase activity by a luminescence method include a method in which peroxidase is reacted with a combination of hydrogen peroxide and a luminescent substance, which are substrates of peroxidase, and the intensity of the generated luminescence is measured using a luminescence intensity meter, luminescence multi-well plate reader, or the like. Examples of the luminescent substance include a luminol compound and a lucigenin compound.

In case the enzyme is alkaline phosphatase, the alkaline phosphatase activity can be measured by, for example, a luminescence method. Examples of a method of measuring alkaline phosphatase activity by a luminescence method include a method in which alkaline phosphatase is reacted with its substrate, and the luminescence intensity of the generated luminescence is measured using a luminescence intensity meter, luminescence multi-well plate reader, or the like.

Examples of the substrate of alkaline phosphatase include 3-(2'-spiroadamantane)-4-methoxy-4-(3'-phosphoryloxy) phenyl-1,2-dioxetane disodium salt (AMPPD), 2-chloro-5-{4-methoxyspiro[1,2-dioxetane-3,2'-(5'-chloro)tricyclo [3.3.1.1$^{3.7}$]decane]-4-yl}phenylphosphate disodium salt (CDP-Star™), 3-[4'-methoxy-5-chlorospiro[tricyclo [3.3.1.1$^{3,7}$]decane-2,3'-[1,2] dioxetane]-4'-yl] phenylphosphate disodium salt (CSPD™), 9-[(phenyloxy) (phosphoryloxy)methylidene]-10-methylacridane disodium salt, and 9-[(4-chlorophenylthio) (phosphoryloxy)methylidene]-10-methylacridane disodium salt (Lumigen™ APS-5).

In case the enzyme is β-D-galactosidase, the β-D-galactosidase activity can be measured by, for example, an absorbance method (colorimetric method), a luminescence method, or a fluorescence method. Examples of the method of measuring β-D-galactosidase activity by an absorbance method (colorimetric method) include the method in which β-D-galactosidase is reacted with its substrate, and the absorbance of the reaction solution is measured by a spectrophotometer, a multi-well plate reader, or such. Examples of the substrate of β-D-galactosidase include o-nitrophenyl-β-D-galactopyranoside. Examples of the method of measuring β-D-galactosidase activity by a luminescence method include a method in which β-D-galactosidase is reacted with its substrate, and the luminescence of the reaction solution is measured by a luminescence intensity meter, luminescence multi-well plate reader, or such. Examples of the substrate of β-D-galactosidase include Galacton-Plus (manufactured by Applied Biosystems), and analogs thereof. Examples of the method of measuring β-D-galactosidase activity by a fluorescence method include a method in which β-D-galactosidase is reacted with its substrate, and the fluorescence of the reaction solution is measured by a fluorometer, fluorescence multi-well plate reader, or such. Examples of the substrate of β-D-galactosidase include 4-methylumbelliferyl-β-D-galactopyranoside.

In case the enzyme is luciferase, the luciferase activity can be measured, for example, by a luminescence method. Examples of the method for measuring luciferase activity by a luminescence method include a method in which luciferase is reacted with its substrate and the luminescence of the reaction solution is measured with a luminescence intensity meter, luminescence multi-well plate reader, or such. Examples of the substrate of luciferase include luciferin and coelenterazine.

In case the label is other than a fluorescent substance, a luminescent substance, a radioisotope, or an enzyme, a labeled body, which is a matter that specifically binds to the label and is labeled with a fluorescent substance, a luminescent substance, a radioisotope, an enzyme, or such, is made to bind with the label in Immunocomplex 2 or the label in Immunocomplex 3, and the label can be measured by measuring with the aforementioned method, the fluorescent substance, the luminescent substance, the radioisotope, or the enzyme labeling the matter that specifically binds to the label. The matter that specifically binds to the label includes antibodies that specifically bind to the label, and also avidins when the label is biotin.

The sample to be used in the present invention is not particularly limited as long as it is a sample that enables the method for measuring FGF-23 of the present invention, and examples include biological samples. Examples of biological samples include whole blood, plasma, serum, urine, spinal fluid, saliva, amniotic fluid, urine, sweat, pancreatic fluid, and such, and whole blood, plasma, serum, urine, and such are preferred.

The antibodies which bind to FGF-23 of the present invention (first antibody and second antibody), are not particularly limited as long as they are antibodies that enable measurement of FGF-23 of the present invention, and while both polyclonal antibodies and monoclonal antibodies can be used, monoclonal antibodies are preferred.

Examples of the antibody fragments of the present invention include antibody fragments with the Fc portion removed, such as Fab obtained by papain treatment of an antibody, F(ab')$_2$ obtained by pepsin treatment of an antibody, and Fab' obtained by pepsin treatment and reduction treatment of an antibody.

In the first antibody and second antibody which bind to FGF-23, used in the present invention, the site of FGF-23 where the first antibody binds and the site of FGF-23 where the second antibody binds can be the same or different, and the sites are preferably different.

The antibodies used in the present invention can be obtained by an ordinary antibody production method using, as the antigen, FGF-23 itself or a peptide corresponding to the epitope in FGF-23. In addition, the antibodies can be obtained as a commercially available product. Examples of the antibodies which bind to FGF-23 include monoclonal antibodies produced by hybridomas deposited as FERM BP-7838, FERM BP-7839, FERM BP-7840, and FERM BP-8268.

Furthermore, in the present invention, an FGF-23-recognizing substance other than an antibody, such as an aptamer which binds to FGF-23, can also be used instead of the antibody which binds to FGF-23.

Aqueous medium used in the present invention is not particularly limited as long as it is an aqueous medium that achieves the method for measuring FGF-23 of the present invention and the examples include deionized water, distilled water, and buffer, and a buffer is preferred. A buffer agent used for preparing a buffer is not particularly limited as long as it has buffering ability. Examples of the buffer include a buffer with pH 1 to 11, such as lactate buffer, citrate buffer, acetate buffer, succinate buffer, phthalate buffer, phosphate buffer, triethanolamine buffer, diethanolamine buffer, lysine buffer, barbiturate buffer, imidazole buffer, malate buffer, oxalate buffer, glycine buffer, borate buffer, carbonate buffer, or Good's buffer.

Examples of the Good's buffer include 2-morpholinoethanesulfonic acid (MES) buffer, bis(2-hydroxyethyl)iminotris (hydroxymethyl)methane (Bis-Tris) buffer, tris(hydroxymethyl)aminomethane (Tris) buffer, N-(2-acetoamido)imino diacetic acid (ADA) buffer, piperazine-N,N'-bis(2-ethanesulfonic acid) (PIPES) buffer, 2-[N-(2-acetamido)amino] ethanesulfonic acid (ACES) buffer, 3-morpholino-2-hydroxypropanesulfonic acid (MOPSO) buffer, 2-[N,N-bis(2-hydroxyethyl)amino]ethanesulfonic acid (BES) buffer, 3-morpholinopropanesulfonic acid (MOPS) buffer, 2-{N-[tris(hydroxymethyl)methyl]amino}ethanesulfonic acid (TES) buffer, N-(2-hydroxyethyl)-N'-(2-sulfoethyl) piperazine (HEPES) buffer, 3-[N,N-bis(2-hydroxyethyl)amino]-2-hydroxypropanesulfonic acid (DIPSO) buffer, 2-hydroxy-3-{[N-tris(hydroxymethyl)methyl]amino}propanesulfonic acid (TAPSO) buffer, piperazine-N,N'-bis(2-hydroxypropane-3-sulfonic acid) (POPSO) buffer, N-(2-hydroxyethyl)-N'-(2-hydroxy-3-sulfopropyl) piperazine (HEPPSO) buffer, N-(2-hydroxyethyl)-N'-(3-sulfopropyl) piperazine (EPPS) buffer, [N-tris(hydroxymethyl)methylglycine] (Tricine) buffer, [N,N-bis(2-hydroxyethyl)glycine] (Bicine) buffer, 3-[N-tris(hydroxymethyl)methyl]aminopropanesulfonic acid (TAPS) buffer, 2-(N-cyclohexylamino) ethanesulfonic acid (CHES) buffer, 3-(N-cyclohexylamino)-2-hydroxypropanesulfonic acid (CAPSO) buffer, and 3-(N-cyclohexylamino) propanesulfonic acid (CAPS) buffer.

The aqueous medium may include salts, a metal ion, sugars, an antiseptic agent, a protein, a protein stabilizer, or such. Examples of the salts include lithium chloride, sodium chloride, potassium chloride, calcium chloride, magnesium chloride, ammonium chloride, lithium bromide, sodium bromide, potassium bromide, calcium bromide, magnesium bromide, and ammonium bromide. Examples of the metal ion include magnesium ion, manganese ion, and zinc ion. Examples of the sugars include mannitol and sorbitol. Examples of the antiseptic agent include sodium azide, an antibiotic (streptomycin, penicillin, gentamicin, etc.), Bioace, ProClin 300, and Proxel GXL. Examples of the protein include bovine serum albumin (hereinafter, referred to as BSA). Examples of the protein stabilizer include Peroxidase Stabilizing Buffer (manufactured by DakoCytomation).

2. Measurement Reagent

The reagent for measuring FGF-23 of the present invention is a reagent used for the method of measuring FGF-23 of the present invention, and comprises a first antibody or an antibody fragment thereof which binds to FGF-23, a second antibody or an antibody fragment thereof which binds to FGF-23, and at least one type of surfactant selected from the group consisting of POE alkyl ethers, POE-POP copolymers, and POE polycyclic phenyl ethers.

Examples of the first antibody or the antibody fragment thereof which binds to FGF-23, and the second antibody or the antibody fragment thereof which binds to FGF-23 in the measurement reagent of the present invention include the aforementioned first antibody or the antibody fragment thereof which binds to FGF-23, and the aforementioned second antibody or the antibody fragment thereof which binds to FGF-23, respectively. The amount of the first antibody or the antibody fragment thereof which binds to FGF-23, and the second antibody or the antibody fragment thereof which binds to FGF-23 contained in the measurement reagent of the present invention is not particularly limited as long as it is an amount that enables the method for measuring FGF-23 of the present invention, and in the aforementioned aqueous medium or in a dissolved state in the aforementioned aqueous medium, it is ordinarily 0.01 µg/mL to 100 µg/mL, and is preferably 0.1 µg/mL to 20 µg/mL.

In the measurement reagent of the present invention, the first antibody or the antibody fragment thereof which binds to FGF-23 may or may not be fixed to an insoluble carrier, and it is preferably fixed to an insoluble carrier. Examples of the insoluble carrier include the aforementioned insoluble carriers.

Furthermore, in the measurement reagent of the present invention, the insoluble carrier to which the first antibody or the antibody fragment thereof which binds to FGF-23 is fixed may be produced in the reaction solution where the sample reacts with the first antibody or the antibody fragment thereof which binds to FGF-23.

In this case, the measurement reagent of the present invention includes, instead of the insoluble carrier to which the first antibody or the antibody fragment thereof which binds to FGF-23 is fixed, a first antibody or an antibody fragment thereof which binds to FGF-23 to which one of the units forming a pair of affinitive substances (A) is bound, and an insoluble carrier to which the other unit forming the pair of affinitive substances (a) is bound. Examples of the combination of the pair of affinitive substances, or more specifically, the combination of A and a include the aforementioned combinations.

The measurement reagent of the present invention may be in a freeze-dried form or in a liquid form. When using a measurement reagent in a freeze-dried form, the reagent is dissolved in an aqueous medium to make a liquid form prior to measurement and then used in the measurement.

In the liquid-form measurement reagent, the first antibody or the antibody fragment thereof which binds to FGF-23, the second antibody or the antibody fragment thereof which binds to FGF-23, and at least one type selected from the group consisting of POE alkyl ethers, POE-POP copolymers, and POE polycyclic phenyl ethers, are in a form dissolved in an aqueous medium.

Examples of the aqueous medium include the aforementioned aqueous media. The aqueous medium may include the aforementioned salts, metal ion, sugars, antiseptic agent, protein, protein stabilizer, or such.

Examples of the POE alkyl ethers, POE-POP copolymers, and POE polycyclic phenyl ethers in the measurement reagent of the present invention include the aforementioned POE alkyl ethers, POE-POP copolymers, and POE polycyclic phenyl ethers, respectively.

The amount of each of the surfactants POE alkyl ethers, POE-POP copolymers, and POE polycyclic phenyl ethers contained in the measurement reagent of the present invention is not particularly limited as long as it is an amount that enables the method for measuring FGF-23 of the present invention, and in the aforementioned aqueous medium or in a dissolved state in the aforementioned aqueous medium, it is ordinarily an amount that makes 0.0001% to 10% (w/v), preferably 0.001% to 5% (w/v), and particularly preferably 0.01% to 1% (w/v).

In the measurement reagent of the present invention, two or more types of surfactants selected from the group consisting of POE alkyl ethers, POE-POP copolymers, and POE polycyclic phenyl ethers may be included in combination.

A label may be bound to the second antibody or the antibody fragment thereof which binds to FGF-23 in the measurement reagent of the present invention. Examples of the label include the aforementioned labels.

3. Measurement Kit

The reagent for measuring FGF-23 of the present invention may be in the form of a kit, from the viewpoint of preservation, transport, distribution, and such. The measurement kit of the present invention is used in the method for measuring FGF-23 of the present invention.

The kit for measuring FGF-23 of the present invention is a kit comprising a first reagent comprising a first antibody or an antibody fragment thereof which binds to FGF-23, and a second reagent comprising a second antibody or an antibody fragment thereof which binds to FGF-23; wherein at least one type of surfactant selected from the group consisting of POE alkyl ethers, POE-POP copolymers, and POE polycyclic phenyl ethers, is included in at least one of the first reagent and the second reagent.

Furthermore, the kit for measuring FGF-23 of the present invention is a kit for measuring FGF-23 comprising a first reagent comprising a first antibody or an antibody fragment thereof which binds to FGF-23, a second reagent comprising a second antibody or an antibody fragment thereof which binds to FGF-23, and a third reagent comprising at least one type of surfactant selected from the group consisting of POE alkyl ethers, POE-POP copolymers, and POE polycyclic phenyl ethers.

Examples of the first antibody or the antibody fragment thereof which binds to FGF-23, and the second antibody or the antibody fragment thereof which binds to FGF-23 in the measurement kit of the present invention include the aforementioned first antibody or the antibody fragment thereof which binds to FGF-23, and the aforementioned second antibody or the antibody fragment thereof which binds to FGF-23, respectively.

The amount of the first antibody or the antibody fragment thereof which binds to FGF-23 in the first reagent containing the first antibody or the antibody fragment thereof which binds to FGF-23 in the measurement kit of the present invention is not particularly limited as long as it is an amount that enables the method for measuring FGF-23 of the present invention, and in the aforementioned aqueous medium or in a dissolved state in the aforementioned aqueous medium, it is ordinarily 0.01 µg/mL to 100 µg/mL, and is preferably 0.1 µg/mL to 20 µg/mL.

The amount of the second antibody or the antibody fragment thereof which binds to FGF-23 in the second reagent containing the second antibody or the antibody fragment thereof which binds to FGF-23 in the measurement kit of the present invention is not particularly limited as long as it is an amount that enables the method for measuring FGF-23 of the present invention, and in the aforementioned aqueous medium or in a dissolved state in the aforementioned aqueous medium, it is ordinarily 0.01 µg/mL to 100 µg/mL, and is preferably 0.1 µg/mL to 20 µg/mL.

In the measurement kit of the present invention, the first antibody or the antibody fragment thereof which binds to FGF-23 may or may not be fixed to an insoluble carrier, and it is preferably fixed to an insoluble carrier. Examples of the insoluble carrier include the aforementioned insoluble carriers.

Furthermore, in the measurement kit of the present invention, the insoluble carrier to which the first antibody or the antibody fragment thereof which binds to FGF-23 is fixed may be produced in the reaction solution where the sample reacts with the first antibody or the antibody fragment thereof which binds to FGF-23.

In this case, the measurement kit of the present invention includes, instead of the insoluble carrier to which the first antibody or the antibody fragment thereof which binds to FGF-23 is fixed, a first antibody or an antibody fragment thereof which binds to FGF-23 to which one of the units forming a pair of affinitive substances (A) is bound and an insoluble carrier to which the other unit forming the pair of affinitive substances (a) is bound. Examples of the combination of the pair of affinitive substances, namely, the combination of A and a include the aforementioned combinations.

In this case, in the measurement kit of the present invention, the first antibody or the antibody fragment thereof which binds to FGF-23 to which one of the units forming a pair of affinitive substances (A) is bound, and the insoluble carrier to which the other unit forming the pair of affinitive substances (a) is bound may be included in the same reagent or in separate reagents, and they are preferably included in separate reagents.

In the case of a kit in which the first antibody or the antibody fragment thereof which binds to FGF-23 to which one of the units forming a pair of affinitive substances (A) is bound and the insoluble carrier to which the other unit forming the pair of affinitive substances (a) is bound are included in separate reagents, the following kits are also included in the kits of the present invention:

a kit which comprises a first reagent comprising a first antibody or an antibody fragment thereof which binds to FGF-23 to which one of the units forming a pair of affinitive substances (A) is bound, and a second reagent comprising an insoluble carrier to which the other unit forming the pair of affinitive substances (a) is bound and a second antibody or an antibody fragment thereof which binds to FGF-23, wherein at least one type of surfactant selected from the group consisting of POE alkyl ethers, POE-POP copolymers, and POE polycyclic phenyl ethers is included in at least one of the first reagent and the second reagent;

a kit which comprises a first reagent comprising a first antibody or an antibody fragment thereof which binds to FGF-23 to which one of the units forming a pair of affinitive substances (A) is bound, a second reagent comprising a second antibody or an antibody fragment thereof which binds to FGF-23, and a third reagent comprising an insoluble carrier to which the other unit forming the pair of affinitive substances (a) is bound, wherein at least one type of surfactant selected from the group consisting of POE alkyl ethers, POE-POP copolymers, and POE polycyclic phenyl ethers is included in at least one of the first to third reagents; and a kit which comprises a first reagent comprising a first antibody or an antibody fragment thereof which binds to FGF-23 to which one of the units forming a pair of affinitive substances (A) is bound, a second reagent comprising a second antibody or an antibody fragment thereof which binds to FGF-23, a third reagent comprising an insoluble carrier to which the other unit forming the pair of affinitive substances (a) is bound, and a fourth reagent comprising at least one type of surfactant selected from the group consisting of POE alkyl ethers, POE-POP copolymers, and POE polycyclic phenyl ethers.

The reagents constituting the measurement kit of the present invention may be in a freeze-dried form or in a liquid form.

When the reagents constituting the measurement kit are in a freeze-dried form, the reagent is dissolved in an aqueous medium to make a liquid form prior to the measurement and then used in the measurement. Examples of the aqueous medium include the aforementioned aqueous media. The aqueous medium may include the aforementioned salts, metal ion, sugars, antiseptic agent, protein, protein stabilizer, or such.

When the reagents constituting the measurement kit are in a liquid form, the first antibody or the antibody fragment thereof which binds to FGF-23, the second antibody or the antibody fragment thereof which binds to FGF-23, and at least one type selected from the group consisting of POE alkyl ethers, POE-POP copolymers, and POE polycyclic phenyl ethers, are in a dissolved state in an aqueous medium. Examples of the aqueous medium include the aforementioned aqueous media. The aqueous medium may include the aforementioned salts, metal ion, sugars, antiseptic agent, protein, protein stabilizer, or such.

The amount of at least one type of surfactant selected from the group consisting of POE alkyl ethers, POE-POP copolymers, and POE polycyclic phenyl ethers contained in the reagents constituting the measurement kit of the present invention is not particularly limited as long as it is an amount that enables the method for measuring FGF-23 of the present invention, and in the aforementioned aqueous medium or in a dissolved state in the aforementioned aqueous medium, it is ordinarily an amount that makes 0.0001% to 10% (w/v), preferably 0.001% to 5% (w/v), and particularly preferably 0.01% to 1% (w/v).

In each of the reagents constituting the measurement kit of the present invention, two or more types of surfactants selected from the group consisting of POE alkyl ethers, POE-POP copolymers, and POE polycyclic phenyl ethers may be included in combination.

A label may be bound to the second antibody or the antibody fragment thereof which binds to FGF-23 in the measurement kit of the present invention. Examples of the label include the aforementioned labels.

Hereinbelow, the present invention will be explained in detail with reference to the Examples, which is not to be construed as limiting the scope of the present invention. In the Examples, reagents of the following manufacturers were used:

disodium hydrogen phosphate (phosphate buffer; manufactured by Kanto Chemical Co., Inc.), sodium dihydrogen phosphate (phosphate buffer; manufactured by Kanto Chemical Co., Inc.), sodium chloride (manufactured by Wako Pure Chemical Industries, Ltd.), MES (manufactured by Dojindo Laboratories), MOPS (manufactured by Dojindo Laboratories), Tween 20 (manufactured by Kanto Chemical Co., Inc.), pepsin (manufactured by Roche Diagnostics), 2-mercaptoethylamine hydrochloride (manufactured by Nacalai Tesque), alkaline phosphatase (manufactured by Roche Diagnostics), Sulfo-HMCS (manufactured by Dojindo Laboratories), NONION E-230 (POE alkyl ether; manufactured by NOF Corporation), NONION K-220 (POE alkyl ether; manufactured by NOF Corporation), PLONON 208 (POE-POP copolymer; manufactured by NOF Corporation), Newcol 740 (POE polycyclic phenyl ether; manufactured by Nippon Nyukazai Co., Ltd.), and BSA (manufactured by Proliant Inc.).

Example 1

FGF-23 Measurement Kits 1 to 4 consisting of the following specimen diluent, an anti-FGF-23 antibody-immobilized microplate, and an alkaline phosphatase (ALP)-labeled anti-FGF-23 antibody solution were produced (Tables 1 and 2). A kit containing a surfactant-free specimen diluent and an ALP-labeled anti-FGF-23 antibody solution was prepared as Kit 5 and used as a comparative example (Table 1).

<Specimen Diluent>

| MES (pH 6.5) | 0.05 mol/L |
|---|---|
| BSA | 0.1% (w/v) |
| Sodium chloride | 0.1 mol/L |
| Surfactant | (surfactants and concentrations described in Tables 1 and 2) |

<Anti-FGF-23 Antibody-Immobilized Microplate>

A 5 µg/mL solution of an anti-FGF-23 antibody (first antibody: anti-FGF-23 monoclonal antibody produced by the hybridoma deposited as FERM BP-7838) in a fixing buffer [0.01 mol/L phosphate buffer (pH7.3) containing 0.14 mol/L of sodium chloride] was dispensed to each well of a 96-well black polystyrene plate (manufactured by Thermo Fisher Scientific) at 100 µL/well, and the plate was incubated at 25° C. for 16 hours. Next, the anti-FGF-23 antibody solution was removed, washing was carried out by adding 250 µL of a blocking solution [1% (w/v) BSA, and a phosphate buffer (pH7.2) containing 0.05% (w/v) Tween20] to each well, and then 250 µL of the blocking solution was added to each well, and this was incubated at 25° C. for 16 hours. Then the blocking solution was removed, and the anti-FGF-23 antibody-immobilized microplate was prepared.

<ALP-Labeled Anti-FGF-23 Antibody Solution>

Anti-FGF-23 antibody (second antibody: anti-FGF-23 monoclonal antibody produced by the hybridoma deposited as FERM BP-7839) was digested using pepsin, and then F(ab')$_2$ was separated on an HPLC system (manufactured by Hitachi High-Tech Science Corporation) that uses a G3000SW column (manufactured by Tosoh Corporation). The obtained F(ab')$_2$ was reduced using 2-mercaptoethylamine hydrochloride, and then Fab' was separated on an HPLC system (manufactured by Hitachi High-Tech Science Corporation) that uses a G3000SW column. The obtained Fab' and alkaline phosphatase were bound by the maleimide method according to the following procedure.

Using the maleimidization reagent Sulfo-HMCS [N-(8-maleimidocapryloxy)sulfosuccinimide, sodium salt], alkaline phosphatase was maleimidized, and the reaction mixture was subjected to a Sephadex G-25 column (manufactured by GE Health Science Japan Co.) to remove the unreacted Sulfo-HMCS, and the maleimidized alkaline phosphatase was obtained.

The prepared maleimidized alkaline phosphatase and Fab' were mixed, and the alkaline phosphatase-labeled Fab' antibody was produced. The obtained alkaline phosphatase-labeled Fab' antibody was used to prepare the ALP-labeled anti-FGF-23 antibody solution consisting of the following composition:

| | |
|---|---|
| MES (pH 6.5) | 0.05 mol/L |
| alkaline phosphatase-labeled Fab' antibody | 0.4 µg/mL |
| BSA | 0.1% (w/v) |
| sodium chloride | 0.1 mol/L |
| surfactant | (surfactants and concentrations described in Tables 1 and 2) |

Example 2

As a method for evaluating the minimum measurable concentration in a measurement system, there is a statistical evaluation method that uses the coefficient of variation [Coefficient of Variation: CV (%)=(standard deviation)/(mean)×100]. Specifically it is a method in which [1] FGF-23 in 0 pg/mL of sample and in each of the multiple FGF-23 samples of known concentrations is measured ten times, [2] the concentration of FGF-23 as the actual measurement value is determined by comparing the obtained measured values with the calibration curve which shows the relationship between the measured values and the FGF-23 concentration, [3] CV (%) of the FGF-23 concentration is calculated, [4] an approximation formula indicating the relationship between the CV (%) and the FGF-23 concentration is formed, and [5] the FGF-23 concentration at which CV becomes 10% is calculated as the minimum detection sensitivity (effective sensitivity) from the approximation formula. A smaller minimum detection sensitivity value implies higher measurement sensitivity.

FGF-23 produced by the method described in WO2003/057733 was used to prepare samples for measurement, each sample having a concentration of 0 pg/mL, 5 pg/mL, 12.5 pg/mL, and 47.6 pg/mL, by using a 0.01 mol/L phosphate buffer (pH6.5) containing 0.3 mol/L sodium chloride and 0.2% BSA (w/v). Furthermore, by a method similar to that described above, FGF-23 solutions at 0 pg/mL, 5 pg/mL, 12.5 pg/mL, 47.6 pg/mL, 190.3 pg/mL, 741.7 pg/mL, and 2981.3 pg/mL were respectively prepared as standard samples for the calibration curve.

Using Measurement Kits 1 to 5 described in Table 1, measurements were performed according to the following method to determine the minimum detection sensitivity.

(1) Preparation of a Calibration Curve

The specimen diluent (80 µL) and the standard sample (20 µL) at each concentration were added to each well of the anti-FGF-23 antibody-immobilized microplate prepared in Example 1, and they were allowed to react at 25° C. for 90 minutes (primary reaction). Each well of the plate subjected to the primary reaction was washed with a washing solution [0.005 mol/L MOPS buffer (pH7.3) containing 0.15 mol/L sodium chloride and 0.075% Tween 20], then ALP-labeled anti-FGF-23 antibody solution (100 µL) prepared in Example 1 was added to each well, and this was allowed to react at 25° C. for 90 minutes (secondary reaction). Each well of the plate subjected to the secondary reaction was washed with the aforementioned washing solution, then a luminescent substrate solution (100 µL) containing 9-[(4-chlorophenylthio) (phosphoryloxy)methylidene]-10-methylacridan disodium salt (Lumigen™ APS-5) as the major ingredient was added to each well and stirred, and the amount of generated luminescence (RLU) was measured to produce a calibration curve representing the relationship between the FGF-23 concentration and the amount of luminescence (RLU).

(2) Measurement of Measurement Samples and Determination of FGF-23 Concentration Except for using each of the measurement samples at 0 µg/mL, 5 µg/mL, 12.5 pg/mL, and 47.6 pg/mL instead of the standard samples described above in (1), the amount of luminescence (RLU) was measured for the measurement samples by a method similar to that of (1). FGF-23 concentration in each of the measurement samples was determined as the actual measurement value from the amount of luminescence (RLU) obtained for each measurement and the calibration curve produced in (1).

CV (%) was calculated from the FGF-23 concentration of each measurement sample, the value that makes CV 10% was calculated with an approximation formula (quadratic function) indicating the relationship between the CV (%) and the FGF-23 concentration, and this was regarded as the minimum detection sensitivity. The minimum detection sensitivities (pg/mL) for the respective kits are indicated in Table 1.

TABLE 1

| | | Examples | | | |
|---|---|---|---|---|---|
| | | Kit 1 | Kit 2 | Kit 3 | Kit 4 |
| | | POE | POE | POE- | POE |
| | Comparative | alkyl | alkyl | POP co- | polycyclic |
| | example | ether | ether | polymer | phenyl ether |
| Surfactant | Kit 5 | NONION | NONION | Pronon | Newcol |
| % (w/v) | No additives | E-230 (0.1%) | K-220 (0.1%) | 208 (0.1%) | 740 (0.1%) |
| Minimum detection sensitivity (pg/mL) | 22 | 5.0 | 3.0 | 5.5 | 7.0 |

As it is clear from Table 1, while the minimum detection sensitivity was 22 µg/mL when measurements were taken using Measurement Kit 5 (comparative example) which does not contain any of the surfactants POE alkyl ether, POE-POP copolymer, and POE polycyclic phenyl ether, or more specifically, when the surfactant is absent in the antigen-antibody reaction, the minimum detection sensitivities were 3.0 pg/mL to 7.0 pg/mL when measurements were taken using Measurement Kits 1 to 4 (Examples) containing the surfactants of Table 1, or more specifically, when the surfactant is present in the antigen-antibody reaction. This revealed that the measurement sensitivity increases and FGF-23 can be measured with high sensitivity.

Example 3

Accuracy tests are often performed as methods for determining whether accurate measurement values are being obtained. The accuracy test involves calculation by the equation "Actual measured value÷Standard value×100 (%)" using the concentration of the component to be measured in a sample having a predetermined concentration of the component to be measured (Standard value) and the concentration of the component to be measured determined by actually measuring its concentration in the sample (Actual measured value). Accuracy closer to 100% implies that the measurements are more accurate.

Using three types of chronic kidney disease patient- or dialysis patient-derived sera in which the FGF-23 concentrations are set (Specimen 1:28 pg/mL; Specimen 2:315 pg/mL; and Specimen 3:2035 pg/mL), the FGF-23 concentration in each specimen was determined according to the method of Example 2 using each of the Kits 1 to 4 produced in Example 1, and their accuracies were calculated. The accuracy results for each of the Kits are shown in Table 2.

TABLE 2

| | | Examples | | | |
|---|---|---|---|---|---|
| | | Kit 1 POE alkyl ether NONION E-230 | Kit 2 POE alkyl ether NONION K-220 | Kit 3 POE-POP copolymer Pronon 208 | Kit 4 POE polycyclic phenyl ether Newcol 740 |
| | Surfactant % (w/v) | (0.1%) | (0.1%) | (0.1%) | (0.1%) |
| Accuracy | Specimen 1 | 108% | 108% | 102% | 106% |
| | Specimen 2 | 108% | 103% | 113% | 106% |
| | Specimen 3 | 115% | 117% | 121% | 115% |

As indicated in Table 2, the accuracy is 102% to 121% when using Measurement Kits 1 to 4 of the present invention which contain a POE alkyl ether, a POE-POP copolymer, or a POE polycyclic phenyl ether; therefore, use of a measurement kit of the present invention was found to be able to accurately measure FGF-23 in a specimen.

INDUSTRIAL APPLICABILITY

The present invention provides an accurate and highly sensitive method, reagent, and kit for measuring FGF-23 in a sample, which are effective for diagnosing diseases such as hypophosphatemic rickets, tumor-induced osteomalacia, and renal failure.

The invention claimed is:
1. A method for measuring fibroblast growth factor-23 (FGF-23) in a sample, which comprises the steps of:
(1) reacting in a first aqueous medium, a sample and a first antibody produced by FERM BP-7838 hybridoma or an antibody fragment thereof which binds to FGF-23 to produce Immunocomplex 1 consisting of FGF-23 and the first antibody or the antibody fragment thereof which binds to FGF-23;
(2) reacting in a second aqueous medium, a second antibody produced by FERM BP-7839 hybridoma or an antibody fragment thereof which binds to FGF-23 with Immunocomplex 1 produced in the aforementioned step (1) to produce Immunocomplex 2 consisting of the first antibody or the antibody fragment thereof which binds to FGF-23, FGF-23, and the second antibody or the antibody fragment thereof which binds to FGF-23; and
(3) measuring Immunocomplex 2 produced in the aforementioned step (2);
wherein
the first aqueous medium comprises at least one type of surfactant selected from the group consisting of NONION E-230, NONION K-220, PLONON 208, and NEWCOL 740, or
the first aqueous medium comprises at least one type of surfactant selected from the group consisting of NONION E-230, NONION K-220, PLONON 208, and NEWCOL 740 and the second aqueous medium is the same as first aqueous medium.

2. The method of claim 1, where in the second antibody or the antibody fragment thereof which binds to FGF-23 comprises a Fab' fragment of FERM BP-7839 monoclonal antibody labeled with an alkaline phosphatase.

3. The method of claim 1, wherein the reaction of step (1) is carried out in the first aqueous medium comprising at least one type of surfactant selected from the group consisting of NONION E-230, NONION K-220, PLONON 208, and NEWCOL 740, using an insoluble carrier to produce the Immunocomplex 1 on the insoluble carrier, and wherein the insoluble carrier is washed after step (1) and before step (2).

4. The method of claim 1, wherein the second aqueous medium is the same as the first aqueous medium.

5. The method of claim 1, wherein the surfactant comprises NONION E-230.

6. The method of claim 1, wherein the surfactant comprises NONION K-220.

7. The method of claim 1, wherein the surfactant comprises PLONON 208.

8. The method of claim 1, wherein the surfactant comprises Newcol 740.

9. The method of claim 1, wherein the second antibody is labeled with one or more selected from an enzyme, a fluorescent substance, a luminescent substance, a radioisotope, biotin, digoxigenin, a polypeptide containing a tag sequence, a metallic colloid particle, and a colored latex particle.

10. The method of claim 9, wherein the enzyme comprises alkaline phosphatase, peroxidase, galactosidase, glucuronidase, or luciferase.

11. The method of claim 9, wherein the fluorescent substance comprises one or more selected from the group consisting of fluorescein isothiocyanate (FITC), rhodamine B-isothiocyanate (RITC), quantum dot (Science, 281, 2016-2018, 1998), phycobiliproteins, and fluorescence-emitting proteins.

12. The method of claim 9, wherein the luminescent substance comprises one or more selected from the group consisting of acridinium ester and derivatives thereof, a ruthenium complex compound, and lophine.

13. The method of claim 9, wherein the radioisotope comprises one or more selected from the group consisting of $^{3}H$, $^{14}C$, $^{35}S$, $^{32}P$, $^{125}I$, and $^{131}I$.

* * * * *